United States Patent
Motoyama et al.

[11] Patent Number: 5,987,585
[45] Date of Patent: Nov. 16, 1999

[54] ONE-CHIP MICROPROCESSOR WITH ERROR DETECTION ON THE CHIP

[75] Inventors: Nobuaki Motoyama; Souichi Kobayashi, both of Itami, Japan

[73] Assignee: Mitsubishi Denki Kabushiki Kaisha, Tokyo, Japan

[21] Appl. No.: 08/196,731

[22] Filed: Feb. 15, 1994

[30] Foreign Application Priority Data

Feb. 16, 1993 [JP] Japan .................................. 5-026772

[51] Int. Cl.$^6$ .................................................. G06F 11/00
[52] U.S. Cl. ............................ 712/1; 712/32; 714/48; 714/800; 714/801; 714/805
[58] Field of Search ...................... 395/800, 575, 395/425; 364/DIG. 1; 371/14; 714/48, 800, 801, 805; 712/1, 32

[56] References Cited

U.S. PATENT DOCUMENTS

| | | | |
|---|---|---|---|
| 4,195,206 | 3/1980 | Baichtal | 370/14 |
| 4,858,234 | 8/1989 | Hartwell et al. | 371/14 |
| 5,214,745 | 5/1993 | Sutherland | 395/22 |
| 5,313,627 | 5/1994 | Amini et al. | 395/575 |
| 5,402,429 | 3/1995 | Stessens | 371/37.1 |

FOREIGN PATENT DOCUMENTS 62-143149  6/1987  Japan .

OTHER PUBLICATIONS

"A 64b CMOS Mainframe Execution Unit Macrocell with Error Detection Circuit", by Takehisa Hayashi et al, IEEE 1991 Custom Integrted Circuits Conference, pp. 15.6.1–15.6.4.

Primary Examiner—Meng-Ai T. An
Assistant Examiner—Dzung Nguyen
Attorney, Agent, or Firm—McDermott, Will & Emery

[57] ABSTRACT

A one-chip microprocessor, in which a built-in cache memory unit 20 has parities, and a cache parity generating & checking unit 21 checks parity of data read from the built-in cache memory unit 20, and when parity error is detected, outputs an internal cache parity error signal 50 to an instruction execution unit 23. By this, the instruction execution unit 23 suspends instruction execution and outputs a processor error signal 37. Accordingly, by checking parity errors of data of built-in memory and inputted address/data, instruction execution are immediately suspended to limit malfunction at least, thereby improving reliability. And by storing kinds of bus operation and errors in a register at the time of error generation, restoring possibility of system level is improved.

10 Claims, 10 Drawing Sheets

Fig. 10

| | BUS ERROR | CACHE PARITY ERROR | TLB PARITY ERROR | INPUT DATA PARITY ERROR | INPUT ADD. PARITY ERROR |
|---|---|---|---|---|---|
| INSTRUCTION READ | ○ | ○ | — | ○ | — |
| ADD. TRANSLATION FOR INSTRUCTION READ TABLE READ | ○ | — | ○ | ○ | — |
| DATA READ | ○ | ○ | — | ○ | — |
| ADD. TRANSLATION FOR DATA READ TABLE READ | ○ | — | ○ | ○ | — |
| DATA WRITE | × | × | — | — | — |
| ADD. TRANSLATION FOR DATA WRITE TABLE READ | × | — | × | × | — |
| BUS SNOOP | — | — | — | — | ○ |

ONE-CHIP MICROPROCESSOR WITH ERROR DETECTION ON THE CHIP

BACKGROUND OF THE INVENTION

1. Field of the Invention

The present invention relates to a one-chip microprocessor with built in memory, such as a cache, a TLB (Translation Lookaside Buffer) and the like, more particularly, the invention relates to techniques which prevent using improper data generated by memory faults in the memory built in the microprocessor, and improper address/data inputted from the outside of the microprocessor. It also relates to a one-chip microprocessor wherein a restoration rate after the occurrence of internal error is improved.

2. Description of the Related Art

With the progress of LSI manufacturing techniques, a central processing unit (CPU) and large-scale memories can be integrated in one chip. However, on the other hand, a reliability of LSI having an improved degree of integration becomes an important problem.

FIG. 1 is a block diagram showing a general configuration of a CPU board, whereon a one-chip microprocessor building in a cache memory and a TLB (Translation Lookaside Buffer) is installed.

The CPU board 1 includes, a conventional microprocessor 2 building in the cache memory and the TLB, an interrupt controller 3 which asserts an interrupt signal to the microprocessor 2 and a system controller bus 9, an external cache memory 5, an external cache controller 4 controlling the external cache memory 5, a main memory 7, a main memory/bus controller 6 controlling the main memory 7 and a system data bus 8 and so on.

The microprocessor 2, interrupt controller 3 and external cache controller 4 are interconnected by a processor bus 10, and the external cache controller 4, external cache memory 5, main memory/bus controller 6 and main memory 7 are interconnected by a memory bus 11.

FIG. 2 is a block diagram showing an internal configuration of the conventional one-chip microprocessor 2 shown in FIG. 1.

The conventional microprocessor 2 includes, a built-in cache memory unit 20, a cache access control unit 22, an instruction execution unit 23, a bus snoop control unit 24, a bus control unit 27, an input/output address unit 51, an input/output data unit 52, an address translation unit 74 and so on.

The cache access control unit 22, the instruction execution unit 23, the input/output address unit 51 and the address translation unit 74 are interconnected by an internal address bus 40, and the cache access control unit 22, the instruction execution unit 23, the input/output data unit 52 and the address translation unit 74 are interconnected by an internal data bus 41.

The cache access control unit 22 controls read/write of the built-in cache memory unit 20. A cache-hit signal 47 is asserted to the instruction execution unit 23 from the cache access control unit 22. A cache access address signal 45 and an access request signal 46 are given to the cache access control unit 22 from the instruction execution unit 23, and besides, a built-in cache invalidating signal 43 is given thereto from a bus snoop control unit 24.

The instruction execution unit 23 processes data according to an instruction sequence. The cache-hit signal 47 is given to the instruction execution unit 23 from the cache access control unit 22. The cache address signal 45 and the access request signal 46 are outputted to the cache access control unit 22 from the instruction execution unit 23, and an address translation control signal 76 is received from and given to the address translation unit 74.

The bus snoop control unit 24 controls to invalidate a specific address stored in the built-in cache memory unit 20 responding to a bus snoop signal 31 inputted from the outside of the microprocessor 2. Specifically, when the bus snoop signal 31 is inputted from the outside of the microprocessor 2, the bus snoop control unit 24, by asserting the built-in cache invalidating signal 43 to the cache access control unit 22 responding thereto, invalidates the specific address stored in the built-in cache memory unit 20.

When the microprocessor 2 accesses the external bus, the bus control unit 27 controls it by inputting and outputting a bus access control signal 36.

The input/output address unit 51 controls the input and output of address between an address bus 32 outside the microprocessor 2 and an internal address bus 40.

The input/output data unit 52 controls the input and output of data between a data bus 34 outside the microprocessor 2 and an internal data bus 41.

The address translation unit 74 builds in the TLB, and translates the address while sending and receiving an address translation control signal 76 to and from the instruction receiving unit 23.

Numeral 30 designates a clock signal supplied to the microprocessor 2.

Next, the operation of the conventional one-chip microprocessor 2 having the above-mentioned configuration is described.

At first, the operation at the time of TLB access and cache memory access is described.

TLB access is performed when the instruction execution unit 23 instructs the address translation unit 74 to translate an address to be accessed. Specifically, when the instruction execution unit 23 requests the address translation to the address translation unit 74 by outputting the address translation control signal 76, and outputs the address to be translated to the internal address bus 40, the address translation unit 74 fetches the address to be accessed from the internal address bus 40 and retrieves the built-in TLB.

When the address to be translated is registered in the built-in TLB, the address translation unit 74 outputs TLB data registered in the built-in TLB to the data bus 41. The instruction execution unit 23 fetches the data outputted from the address translation unit 74 from the data bus 41 to execute the instruction. The address translation unit 74 also outputs the address translation control signal 76 to the instruction execution unit 23 to inform completion of the address translation.

Cache memory access is performed as follows.

When the access request signal 46 and the cache access address signal 45 which designates address to be accessed are asserted to the cache access control unit 22 from the instruction execution unit 23, the cache access control unit 22 retrieves whether the address designated by the cache access address signal 45 is registered in the built-in cache memory unit 20 or not. When the address designated by the cache access address signal 45 is registered in the built-in cache memory unit 20, the cache access control unit 22 asserts the cache-hit signal 47 to the instruction execution unit 23, reads corresponding cache data from the built-in cache memory unit 20 and outputs it to the internal data bus 41. The instruction execution unit 23 fetches the data outputted to the internal data bus 41 to execute the instruction.

Now, when TLB access address data is not registered in the built-in TLB or data designated by the cache access address signal 45 is not registered in the built-in cache memory unit 20 at the time of TLB access, the microprocessor 2 executes bus access to the external memory of the microprocessor 2 or the main memory 7 shown in FIG. 7. When an abnormal state has occurred at the time of bus access, this is alerted to the microprocessor 2 by a bus error (berr#: # means low active) signal which is one of the bus access control signal 36. When the bus error signal is asserted at completion of the bus access, the microprocessor 2 stores error in formation of address, data, data size, read/write and so on which have generated the error in an internal register.

Next, the bus snooping operation is described.

When DMA (Direct Memory Access) is transferred by the main memory/bus controller 6 on the CPU board 1 and data stored in a certain address of the main memory 7 is changed, there is a possibility that a consistency of data stored in the built-in cache memory unit 20 and the main memory 7 as the same address data can not be held.

In this case, it is necessary to invalidate the specific address of the built-in cache memory unit 20 to hold the consistency of data between the built-in cache memory unit 20 and the main memory 7. Such an operation is the bus snooping and is specifically described in the following.

The external cache controller 4 always monitors whether the data stored in the main memory 7 has been reloaded or not, and instructs the bus snooping operation to the microprocessor 2 according to the monitor result.

At the time of the bus snooping operation, at first, the bus snoop control signal 31 is asserted to the microprocessor 2 from the external cache controller 4, and address to be invalidated is outputted to the address bus 32. When an mreq# signal which is one of the bus snoop control signal 31 is asserted, the input/output address unit 51 suspends to output the address to the address bus 32 and inputs the address to be invalidated from the address bus 32. When ms# signal which is one of the bus snoop control signal 31 is inputted to the bus snoop control unit 24, which asserts the built-in cache invalidating signal 43 to the cache access control unit 22.

At this time, the input/output address unit 51 outputs the address to be invalidated to the internal address bus 40. When receiving the built-in cache invalidating signal 43, the cache access control unit 22 fetches the address to be invalidated outputted to the internal address bus 40 and retrieves the built-in cache memory unit 20. As a result, when the address is already registered in the built-in cache memory unit 20, the cache access control unit 22 invalidates the address.

In the above-mentioned memory access operation of the conventional microprocessor, even when memory faults such as software errors have occurred in the built-in cache memory unit, the TLB and the like, there is no way to detect it, thus there was a possibility that the instruction is executed intact by using data having the memory fault for false operation, results in data destruction.

Since a memory cell of the built-in cache, the TLB and the like can be more downsized by using an NMOS (high resistance load type) than using a CMOS, it is desirable to use the NMOS from the view point of a high integration of a chip. However, when the memory cell is constituted by the NMOS, a possibility of occurrence of memory faults is relatively high.

Since a function for checking the address to be invalid dated inputted to the microprocessor at the time of bus snooping operation is not included in the conventional microprocessor, when the bus fault has occurred on the CPU board, the wrong address caused by the bus fault is inputted to the microprocessor, thereby the built-in cache memory is invalidated at an address at which the built-in cache memory need not be invalidated and the address which was to be invalidated originally is not invalidated. In such cases, the built-in cache memory is accessed without the consistency of data between the main memory and the built-in cache memory, thus there was also a possibility that the old data which is to be invalidated originally is used to execute the instruction, results in a wrong operation and data destruction.

Furthermore, when error information related to errors generated at the time of bus access is to be saved, only read/write information related to the type of bus cycle can be saved in the conventional microprocessor. For example, as to the read bus access, it was problematic in that, conventionally, the instruction read and the address translation table read for data storage can not be distinguished.

Regarding this respect, for example, in the Japanese Patent Application Laid-Open No. 62-143149 (1987), a memory management unit of an information processing system, having holding means for holding error information including details on failure causes when access to a storage medium has failed is disclosed. However, in the invention disclosed in the Japanese Patent Application Laid-Open No. 62-143149 (1987), a virtual memory management method is adopted in the information processing system for pipeline processing of a decode-and-address calculating stage and an operation execution stage, and a technique coping with page fault generated thereby is disclosed, but address errors, data errors and the like in the CPU board whereon the one-chip microprocessor is installed are not considered.

SUMMARY OF THE INVENTION

The present invention has been devised in view of the above-mentioned circumstances, therefore, in a first invention, it is an object thereof to provide a one-chip microprocessor capable of detecting the occurrence of memory faults, by checking the parity when data is read from a memory such as a built-in cache memory, a TLB and the like.

It is another object, in a second invention, to provide a one-chip microprocessor capable of preventing invalidation of data by a wrong address, when the data in the built-in cache memory is invalidated by the bus snooping operation.

It is a further object, in a third invention, to provide a one-chip microprocessor in which the return processing is facilitated by holding information for specifying the kind of error generated at the time of external bus access.

The first invention of the one-chip microprocessor of the present invention is characterized by comprising: instruction executing means for executing instructions; storing means (a cache memory, TLB), which is accessible by instruction execution of the instruction execution unit, for storing a plurality of data and parties responding to respective data; and parity generating and checking means, which is connected to the storing means, for, when data is read from the storing means by instruction execution of the instruction executing means, generating the parity of the data which has been read, and for checking the parity read, from the storing means responding to the data which has been read to generate a parity error signal when detecting a parity error; wherein, when the parity generating and checking means generates the parity error signal, the instruction executing means suspends the instruction execution and outputs a signal to the outside to inform an occurrence of error.

The second invention of the one-chip microprocessor of the present invention is characterized by comprising: an instruction execution unit executing instructions; a cache memory which is accessible by instruction execution of the instruction execution unit; an internal address bus; address inputting means for inputting addresses from the outside and outputting them to the internal address bus; address parity inputting means for inputting address parities from the outside; bus snooping means, to which an invalidating request signal of the cache memory is inputted from the outside, for snooping the internal address bus and outputting a predetermined signal when the address outputted to the internal address bus is the address to be invalidated; and parity checking means, which is connected to the internal address bus and the address parity input means, for, when the predetermined signal is out putted from the bus snooping means, checking the address parity outputted to the internal address bus, and generates a parity error signal when detecting a parity error; wherein, when the parity checking means generates the parity error signal, the instruction execution unit suspends the instruction execution and outputs a signal to the outside to inform an occurrence of error.

The third invention of the one-chip microprocessor of the present invention is characterized by comprising: an instruction execution unit executing instructions; a memory which is accessible by instruction execution of the instruction execution unit; a memory management unit performing address translation referring to an address translation table by the instruction from the instruction execution unit; a bus access control unit performing external bus access by the request from the instruction execution unit or the memory management unit; error detecting means for detecting an abnormal bus access generated as the result of bus access by the bus access control unit, and generating different error signals responding to the kinds of resulting abnormal bus access; a status register which is connected to the bus access control unit, storing the kind of bus access being executed; and an error register, which is connected to the error detecting means and the status register, holding error information; wherein the bus access control unit, when starting the bus access, holds information showing whether the bus access is a read access or a write access, information showing whether an object to be accessed is an instruction or data, information showing whether the memory management unit accesses the address translation table or not for translating the read access address, and information showing whether the memory management unit accesses the address translation table or not for translating the write access address, in the status register, and the error register holds the error signal and information held in the status register, when the error detecting means detects the error.

In the first invention of the one-chip microprocessor of the present invention, memory fault of the storing means (built-in cache memory, built-in TLB) is detected by the parity checking means, the parity error signal is generated to instruct the instruction executing means not to execute the instruction further, and the signal is outputted to the outside to alert the occurrence of error.

In the second invention of the one-chip microprocessor of the present invention, the address to be invalidated by the bus snooping operation is checked by the address parity inputting means and the address parity checking means, and when the parity error is generated, the parity error signal is generated to instruct the instruction execution unit not to execute the instruction further, and the signal is outputted to the outside to alert the occurrence of error.

Furthermore, in the third invention of the one-chip microprocessor of the present invention, the kind of bus access being executed is stored in the status register, and when one of the error signals becomes effective, error information including the kind of bus operations such as the bus access, bus snoop and the like and the kind of error is held by the error register.

The above and further objects and features of the invention will more fully be apparent from the following detailed description with accompanying drawings.

BRIEF DESCRIPTION OF THE DRAWINGS

FIG. 10 is a table showing the relationship between the kind of bus operations and damages due to the occurrence of internal errors of one-chip microprocessor of the present invention.

DESCRIPTION OF THE REFERRED EMBODIMENTS

In the following, the present invention is described on the basis of the drawings showing its embodiments.

Figure 3:
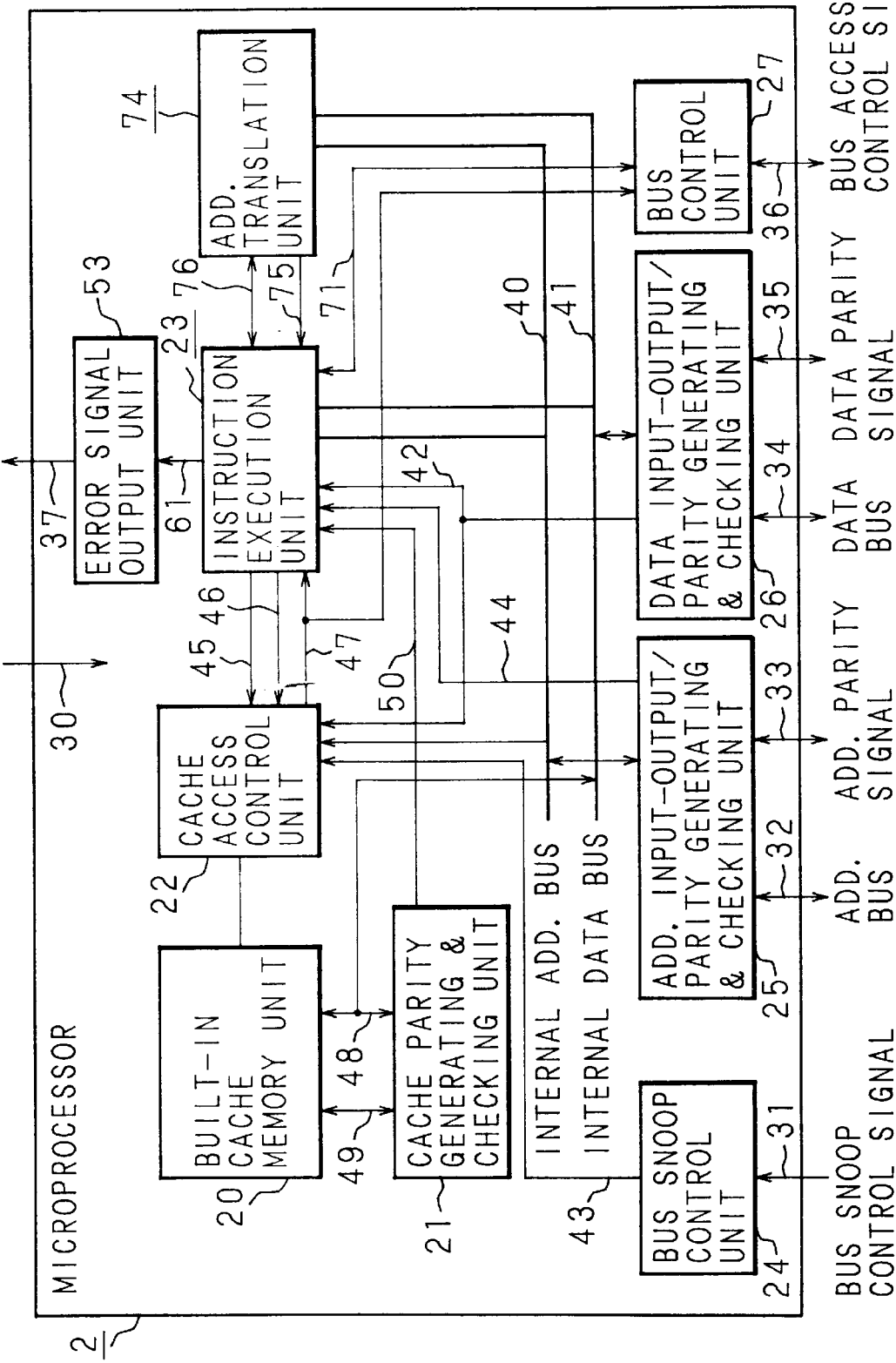
FIG. 3 is a block diagram showing an internal configuration of one embodiment of a one-chip microprocessor of the present invention building in a cache memory and a TLB.

A block diagram of FIG. 3 shows an internal configuration of one embodiment of a one-chip microprocessor of the present invention building in a cache memory and a TLB.

Figure 1:
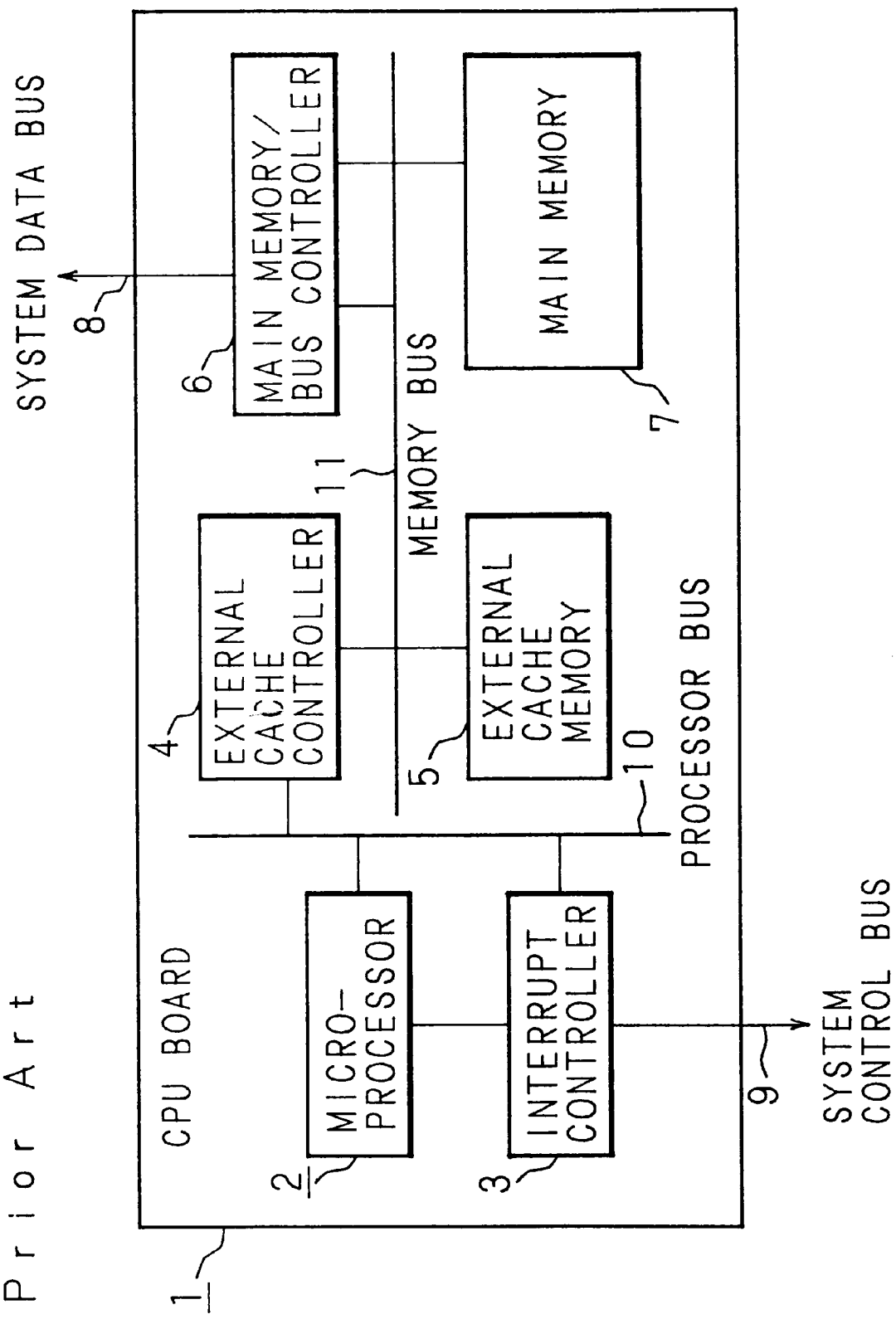
FIG. 1 is a block diagram showing a general configuration of a CPU board, whereon a conventional one-chip microprocessor and a one-chip microprocessor of the present invention building in a cache memory and a TLB is installed.
Figure 2:
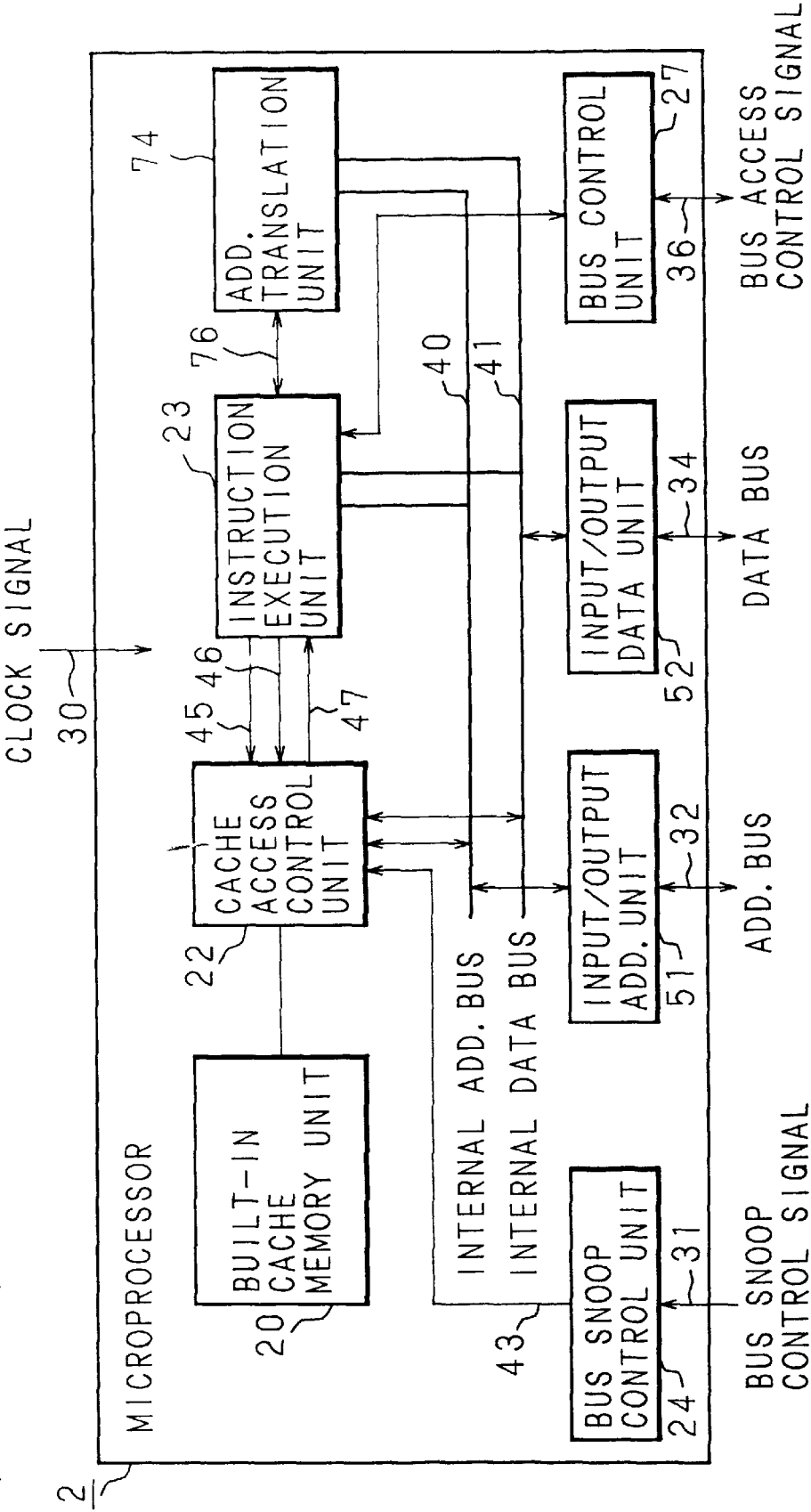
FIG. 2 is a block diagram showing an internal configuration of a conventional one-chip microprocessor.

The one-chip microprocessor of the present invention has the same configuration as an aforementioned CPU board 1 shown in FIG. 1 when installed on the CPU board.

The one-chip microprocessor 2 of the present invention includes, a built-in cache memory unit 20, a cache parity generating & checking unit 21, a cache access control unit 22, an instruction execution unit 23, a bus snoop control unit 24, an address input-output/parity generating & checking unit 25, a data input-output/parity generating & checking unit 26, a bus control unit 27, an error signal output unit 53, an address translation unit 74 and so on.

The cache access control unit 22, instruction execution unit 23, address input-output/parity generating & checking unit 25 and address translation unit 74 are interconnected by an internal address bus 40, and the built-in cache memory unit 20, cache parity generating & checking unit 21, instruction execution unit 23, data input-output/parity generating & checking unit 26 and address translation unit 74 are interconnected by an internal data bus 41.

The cache parity generating & checking unit 21, at the time of cache read, generates the parity from a cache data input/output signal 48 outputted from the built-in cache memory unit 20 and compares it with a cache data parity input/output signal 49, and at the time of cache write, fetches the cache data input/output signal 48 inputted to the built-in cache memory unit 20 from the internal data bus 41 to write data and generates the parity to be registered in the built-in cache memory unit 20.

When the above-mentioned comparison result does not show coincidence, the cache parity generating & checking unit 21 outputs an internal cache parity error signal 50 to the instruction execution unit 23.

The cache access control unit 22 controls read/write of the built-in cache memory unit 20. A cache-hit signal 47 is asserted to the instruction execution unit 23 and the bus control unit 27 from the cache access control unit 22. Besides a cache access address signal 45 and a access request signal 46 are given to the cache access control unit 22 from the instruction execution unit 23, a built-in cache invalidating signal 43 is given from the bus snoop control unit 24 and an internal data parity error signal 42 is given from the data input-output/parity generating & checking unit 26.

The instruction execution unit 23 processes data according to an instruction sequence. To the instruction execution unit 23, the cache-hit signal 47 is given from the cache access control unit 22, a TLB parity error signal 75 from the address translation unit 74, the internal cache parity error signal 50 from the cache parity generating & checking unit 21, an internal address parity error signal 44 from the address input-output/parity generating & checking unit 25 and the internal data parity error signal 42 from the data input-output/parity generating & checking unit 26.

Besides the cache access address signal 45 and the access request signal 46 are outputted to the cache access control unit 22 from the instruction execution unit 23, and an address translation control signal 76 sent to and received from the address translation unit 74, an internal bus access information signal 71 which controls external bus access is sent to and received from the bus control unit 27.

Numeral 61 designates an internal error signal, which is outputted to the error signal output unit 53 from the instruction execution unit 23 at the time of occurrence of the error.

The bus snoop control unit 24 controls to invalidate a specific address stored in the built-in cache memory unit 20 responding to a bus snoop signal 31 inputted from the outside of the microprocessor 2. Specifically, when the bus snoop signal 31 is inputted from the outside of the microprocessor 2, the bus snoop control unit 24, responding thereto, asserts the built-in cache invalidating signal 43 to the cache access control unit 22 to invalidate the specific address stored in the built-in cache memory unit 20.

The address input-output/parity generating & checking unit 25 outputs a value of the internal address bus 40 to the outside of the microprocessor 2 at the time of external bus access, and generates the address parity for output, and at the time of input operation such as the bus snooping operation and the like, inputs address of the address bus 32 and an address parity signal 33 for parity check. When the above-mentioned parity check result does not show coincidence, the address input-output/parity generating & checking unit 25 outputs the internal address parity error signal 44 to the instruction execution unit 23.

The data input-output/parity generating & checking unit 26 inputs data of a data bus 34 and a data parity signal 35 for parity check at the time of external read access. When the above-mentioned parity check result does not show coincidence, the data input-output/parity generating & checking unit 26 outputs the internal data parity error signal 42 to the cache access control unit 22 and the instruction execution unit 23.

The bus control unit 27, at the time of external bus access by the microprocessor 2, inputs and outputs the bus access control signal 36 for control thereof. Besides the cache-hit signal 47 is given to the bus control unit 27 from the cache access control unit 22, the internal bus access information signal 71 is sent to and received from the instruction execution unit 23.

The error signal output unit 53 outputs a processor error signal 37 to the outside of the microprocessor 2, when the internal error signal 61 is given from the instruction execution unit 23.

The address translation unit 74 builds in the TLB (Translation Lookaside Buffer) and translates the address while sending and receiving the address translation control signal 76 to and from the instruction execution unit 23.

Numeral 30 designates a clock signal applied to the microprocessor 2.

Figure 4:
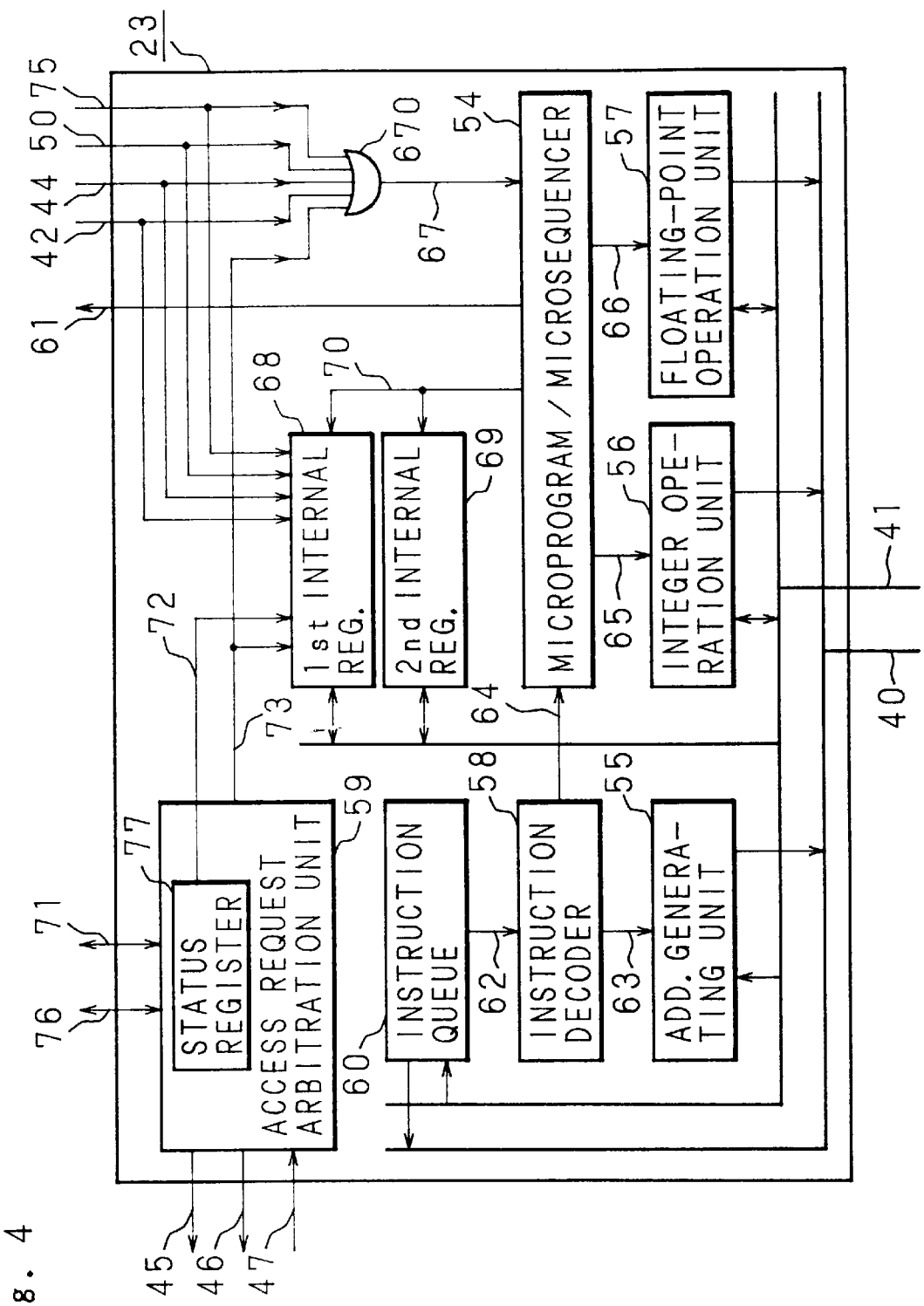
FIG. 4 is a block diagram showing a specific example of an internal configuration of an instruction execution unit of a one-chip microprocessor of the present invention.

FIG. 4 is a block diagram showing a specific example of an internal configuration of the instruction execution unit 23 of the one-chip microprocessor of the present invention shown in FIG. 3.

The instruction execution unit 23 of the microprocessor 2 of the present invention includes, a microprogram/microsequencer 54, an address generating unit 55, an integer operation unit 56, a floating-point operation unit 57, an instruction decoder 58, an access request arbitration unit 59, an instruction queue 60 and a plural number of internal registers (a first internal register 68, a second internal register 69 etc.) and so on.

A status register 77 is built in the access request arbitration unit 59.

The microprogram/microsequencer 54 receives a microcontrol signal 64 from the instruction decoder 58, and gives an integer operation unit control signal 65 to the integer operation unit 56 and a floating-point operation unit control signal 66 to the floating-point operation unit 57 to control the instruction execution performed thereby. When any of the internal data parity error signal 42, internal address parity error signal 44, internal cache parity error signal 50 and TLB parity error signal 75 is generated, the microprogram/microsequencer 54 receives it as the parity error signal 67 via an OR gate 670 for processing the error.

The microprogram/microsequencer 54 outputs the internal error signal 61 out from the instruction execution unit 23 at the time of error processing, and gives an internal register control signal 70 to the first internal register 68 to store the states of the above-mentioned signals 42, 44, 50 and 75 therein.

The address generating unit 55 is connected to the internal address bus 40 and the internal data bus 41, and calculates the address when an address generating information signal 63 is given from the instruction decoder 58.

The integer operation unit 56 is connected to the internal address bus 40 and the internal data bus 41, and processes the integer operation by the integer operation control signal 65 given from the microprogram/microsequencer 54.

The floating-point operation unit 57 is also connected to the internal address bus 40 and the internal data bus 41, and processes the floating-point operation by the floatingpoint operation control signal 66 given from the microprogram/microsequencer 54.

The instruction decoder 58 decodes an instruction code 62 sent from the instruction queue 60 and sends the microcontrol signal 64 to the microprogram/microsequencer 54, and the address generating information signal 63 to the address generating unit 55.

The access request arbitration unit 59 arbitrates various access requests such as the instruction read access request from the instruction queue 60, and the operand fetch request from the microprogram/microsequencer 54 generated in the instruction execution unit 23 to assert the cache access address signal 45 and the access request signal 46 to the cache access control unit 22, and to receive the cache hit signal 47 from the cache access control unit 22. The access request arbitration unit 59 sends and receives the bus access information signal 71 to and from the bus control unit 27 to store the external bus access state, and at the same time, sends to a bus access state signal 72 to the first internal register 68, and further, sends and receives the address translation control signal 76 to and from the address translation unit 74 for address translation control. Meanwhile, when the bus error has occurred, the access request arbitration unit 59 outputs an internal bus error signal 73 to the first internal register 68 and the OR gate 670.

The instruction queue 60 is connected to the internal address bus 40 and the internal data bus 41, generates the read request of the instruction to be executed next to read the instruction from the internal data bus 41 to stock it beforehand, and outputs the instructions sequentially to the instruction decoder 58 as the instruction code 62.

As mentioned before, the first internal register 68, when the internal register control signal 70 is given from the microprogram/microsequencer 54, stores the states of the internal data parity error signal 42, internal address parity error signal 44, internal cache parity error signal 50, bus access state signal 72, internal bus error signal 73 and TLB parity error signal 75 as error information.

A flow of instruction execution of the instruction execution unit 23 or a pipeline is in the following order, that is, the instruction queue 60→instruction decoder 58→address generating unit 55 and the microprogram/microsequencer 54→integer operation unit 56 and floating-point operation unit 57.

Figure 5:
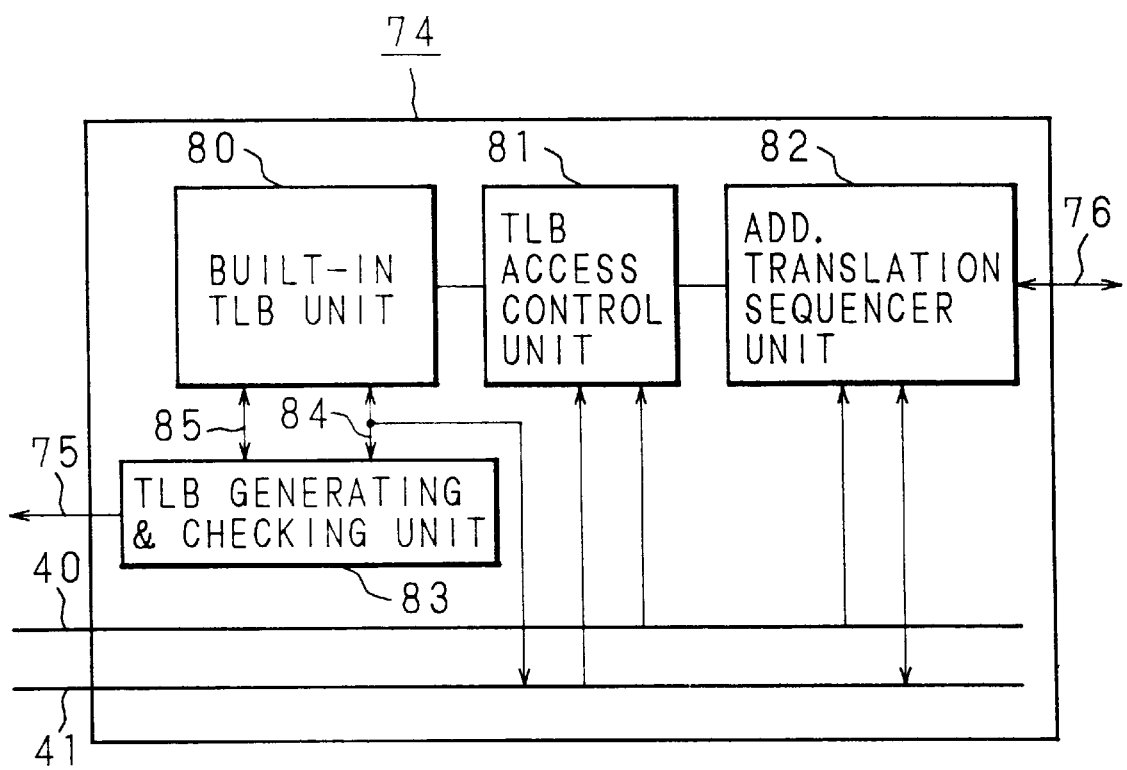
FIG. 5 is a block diagram showing a specific example of an internal configuration of an address translation unit of a one-chip microprocessor of the present invention.

FIG. 5 is a block diagram showing a specific example of an internal configuration of the address translation unit 74 of the one-chip microprocesso 2 of the present invention shown in FIG. 3.

The access translation unit 74 of the microprocessor 2 of the present invention is constituted by a built-in TLB unit 80, a TLB access control unit 81, an address translation sequencer unit 82 and a TLB parity generating & checking unit 83. The TLB access control unit 81 and the address translation sequencer unit 82 are connected to the internal address bus 40 and the internal data bus 41, and the address translation control signal 76 is given to the address translation sequencer unit 82 from the access request arbitration unit 59 of the instruction execution unit 23.

TLB data is inputted to and outputted from the built-in TLB unit 80 and the TLB parity generating & checking unit 83 as a TLB data signal 84 between the internal data bus 41 and them. The TLB parity generating & checking unit 83 generates and checks the parity of data inputted and outputted as the TLB data signal 84, and at the time of data input, outputs the generated parity to the built-in TLB unit 80 as the TLB parity signal 85, and at the time of data output, compares the parity generated from the data outputted from the built-in TLB unit 80 as the TLB data signal 84 with the TLB parity signal 85 outputted with the data, and outputs the TLB parity error signal 75 as the occurrence of error when the result does not show coincidence.

In the following, the operation of the microprocessor 2 of the present invention is described.

At first, the operation at the time of memory access is described with reference to time charts of FIG. 6 and FIG. 7.

Figure 6:
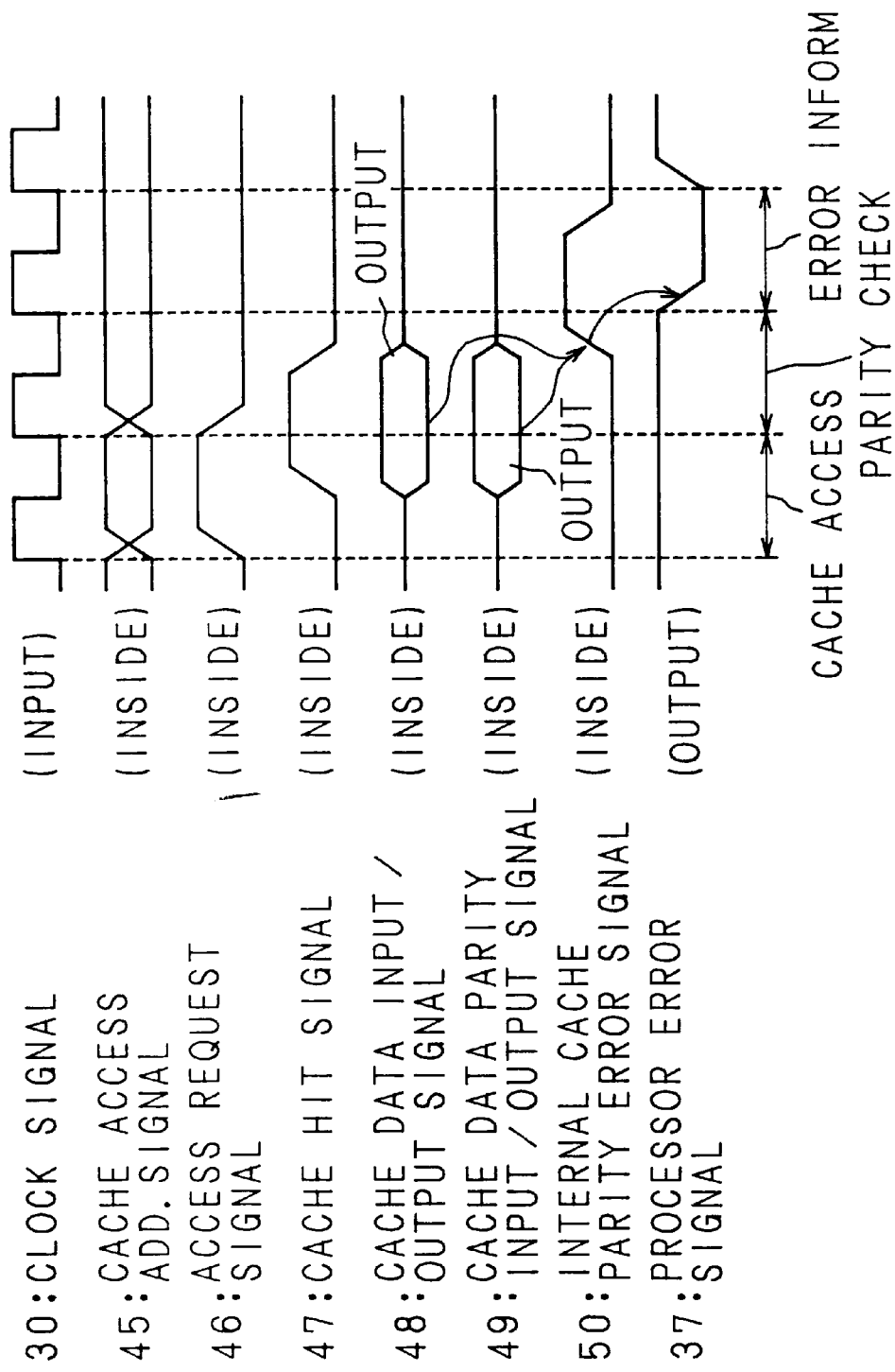
FIG. 6 is a timing chart showing states of respective signals at the time of accessing operation to a built-in cache memory unit of a one-chip microprocessor of the present invention.

FIG. 6 is the time chart showing the states of respective signals at the time of accessing operation to the built-in cache memory unit 20 of the one-chip microprocessor 2 of the present invention.

The instruction execution unit 23 asserts the access request signal 46 to the cache access control unit 22 when reading data, and outputs address to be accessed as the cache access address signal 45.

The cache access control unit 22 retrieves the built-in cache memory unit 20 by the address designated by the cache access address signal 45.

When data designated by the cache access address signal 45 is already registered in the built-in cache memory unit 20, the cache access control unit 22 asserts the cache-hit signal 47, outputs the data to the internal data bus 41 and the cache parity generating & checking unit 21 as the cache data input/output signal 48, and outputs the data parity to the cache parity generating & checking unit 21 as the cache data parity input/output signal 49.

The instruction execution unit 23 fetches the cache data input/output signal 48 from the internal data bus 41 as data to be accessed to execute the instruction.

At this time, the cache parity generating & checking unit 21 generates the parity from the cache data input/output signal 48 outputted to the internal data bus 41 by the built-in cache memory unit 20, and at the same time, compares and checks with the cache data parity input/output signal 49 outputted from the built-in cache memory unit 20.

When the check result does not show coincidence or when the error is generated, the cache parity generating & checking unit 21 immediately asserts the internal cache parity error signal 50 to the instruction execution unit 23.

When the internal cache parity error signal 50 is asserted, the instruction execution unit 23 asserts a processor error signal 37.

When address data designated by the cache access address signal 45 is not registered in the built-in cache memory unit 20, bus access is performed to the outside of the microprocessor 2. Since the cache-hit signal 47 is also sent to the bus control unit 27, the occurrence of cache miss is transferred to the bus control unit 27 by not asserting the cache-hit signal 47, so that the bus control unit 27 starts the external bus access according to the internal bus access information signal 71 by using the address outputted to the internal address bus 40.

Figure 7:
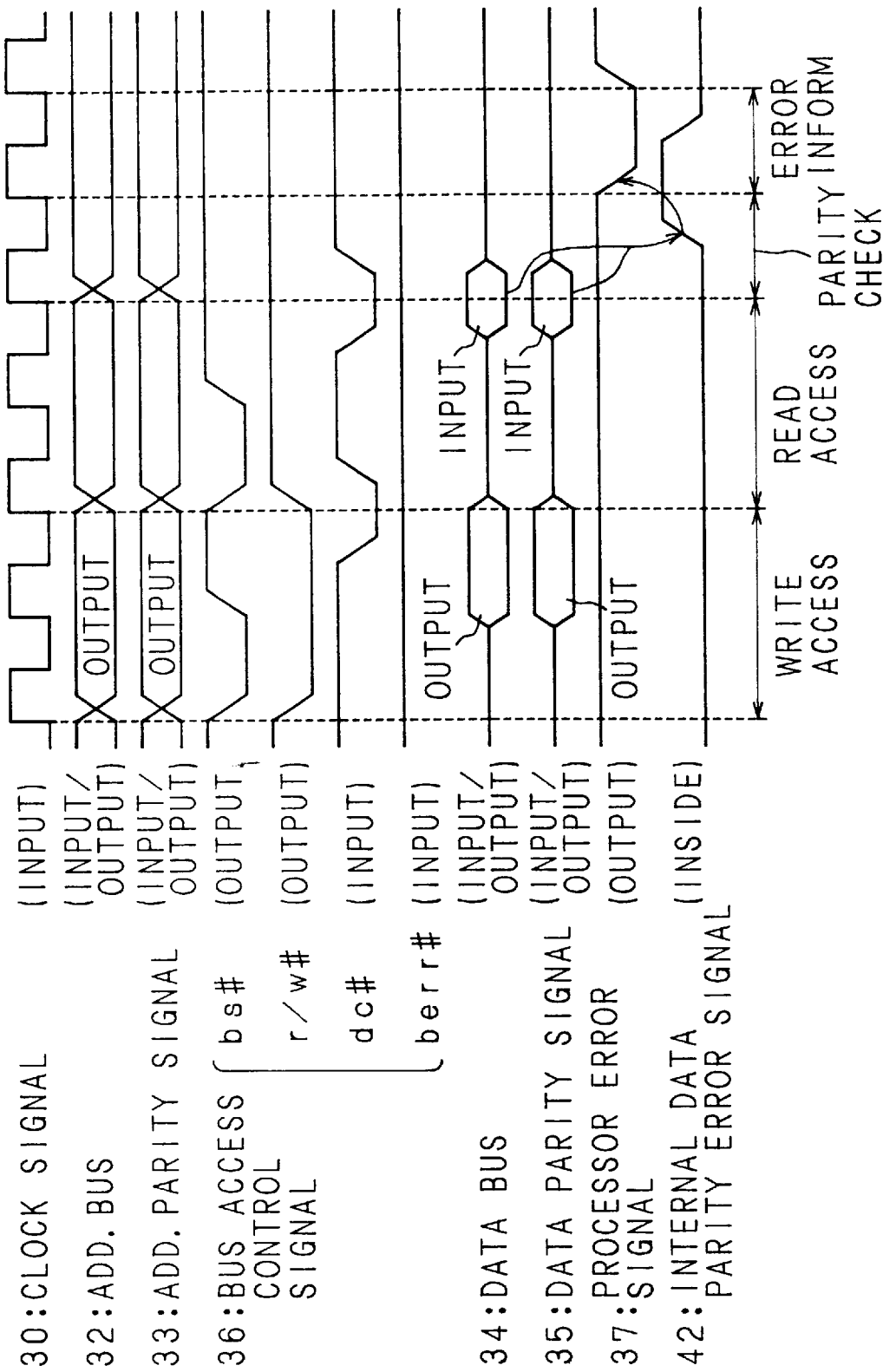
FIG. 7 is a timing chart showing states of respective signals at the time of read access and write access operations of a one-chip microprocessor of the present invention.

FIG. 7 is the timing chart showing the states of respective signals at the time of read access and write access of the one-chip microprocessor 2 of the present invention.

At first, the operation at the time of read access is described.

The address outputted to the internal address bus 40 from the instruction execution unit 23 is outputted to the outside of the microprocessor 2 via the address bus 32, after being inputted to the address input-output/parity generating & checking unit 25. In the address input-output/parity generating & checking unit 25, the address parity is generated from the address fetched from the internal address bus 40, and is outputted to the outside of the microprocessor 2 as the address parity signal 33 simultaneously with the output of the address bus 32.

At this time, the bus access control signal 36 is asserted from the bus control unit 27. A bs# in the bus access control signal 36 is an output signal indicating the bus access start, an r/w# is an output signal indicating an input/output direction of the external data bus 34 and a dc# is an input signal indicating the completion of bus access.

When the address outputted to the address bus 32 is registered in an external cache 5, an external cache controller 4 outputs data to the data bus 34 from the external cache 5 and the data parity as the data parity signal 35 and sends them to the microprocessor 2.

When the address outputted to the address bus 32 is not registered in the external cache 5, the external cache controller 4 reads data from a main memory 7 via a main memory/bus controller 6 to register it in the external cache 5, and at the same time, sends respectively the data via the data bus 34 and the parity as the data parity signal 35 to the microprocessor 2.

When the completion of bus access is detected by the dc# signal which is one of the cache-hit/miss signal 36, in the microprocessor 2, the data input-output/parity generating & checking unit 26 fetches data on the data bus 34 and the parity on the data parity signal 35 to generate the data parity from the data, and at the same time, compares it with the data parity inputted as the data parity signal 35 for check.

When the comparison result of the parity shows coincidence, the data is sent to the instruction execution unit 23 via the internal data bus 41, and at the same time, registered in the built-in cache memory unit 20. The parity to be written into the built-in cache memory unit 20 at the time of registering the data in the built-in cache memory unit 20, is generated in the same circuit as a check circuit of the cache parity generating & checking unit 21.

When the parity error is generated in the data bus 34 on the CPU board 1 by some fault, since the parity generated in the data input-output/parity generating & checking unit 26 and the parity inputted from the outside as the data parity signal 35 do not coincide, the parity error is detected. When the parity error is generated, the data input-output/parity generating & checking unit 26 informs to the instruction unit 23 and the cache access control unit 22 that there is an error in the data which has been sent, by asserting the internal data parity error signal 42.

When the internal data parity error signal 42 is asserted, the instruction execution unit 23 asserts the processor error signal 37.

At the time of writing data to the outside by the microprocessor 2, the instruction execution unit 23 informs the write request to the bus control unit 27 by the internal bus access information signal 71, and at the same time, outputs address of the writing destination to the internal address bus 40 and data to be written to the internal data bus 41.

The address input-output/parity generating & checking unit 25 fetches the address from the internal address bus 40 and outputs it to the outside of the microprocessor 2 via the address bus 32. At this time, the address input-output/parity generating & checking unit 25 generates the parity from the address fetched from the internal address bus 40, and outputs the address parity to the outside of the microprocessor 2 as the address parity signal 33.

The bus control unit 27 asserts the bus access control signal 36 necessary for write access in response to the write request in the internal bus access information signal 71. One clock after starting the write access, the data input-output/parity generating & checking unit 26 fetches data to be written from the internal data bus 41, and outputs it to the outside of the microprocessor 2 via the data bus 34. At this time, the data input-output/parity generating & checking unit 26 generates the parity from the data fetched from the internal data bus 41, and outputs the data parity to the outside of the microprocessor 2 as the data parity signal 35. When receiving data by the write access of the microprocessor 2, the external cache controller 4 asserts the dc# signal which is one of the bus access control signal 36 indicating the completion of access.

Next, the operation at the time of TLB access is described.

When the instruction execution unit 23 requests address translation to the address translation unit 74 by the address translation control signal 76, the address translation sequencer 82 in the address translation unit 74 starts an address translation sequence. The address translation sequencer 82 requests access of the built-in TLB unit 80 to the TLB access control unit 81 according to the address translation sequence. The TLB access control unit 81 fetches the address to be accessed from the internal address bus 40 and retrieves the built-in TLB unit 80.

When the address to be accessed is already registered in the built-in TLB unit 80, the TLB data signal 84 is outputted to the data bus 41 from the built-in TLB unit 80, and the TLB parity signal 85 responding to the TLB data is outputted to the TLB parity generating & checking unit 83. The instruction execution unit 23 fetches the data read from the address translation unit 74 from the data bus 41 to execute the instruction. The address translation unit 74 informs the completion of address translation to the instruction execution unit 23 by the address translation control signal 76.

The TLB parity generating & checking unit 83 fetches the TLB data signal 84 to generate the parity, and compares it with the TLB parity signal 85 for check. When the comparison result does not show coincidence, the TLB parity generating & checking unit 83 asserts the TLB parity error signal 75 to the instruction execution unit 23.

Timings of data read from the built-in TLB unit 80, parity check by the TLB parity generating & checking unit 83 and asserting of the TLB parity error signal 75 are same as the cache read timings shown in a timing chart of FIG. 6.

At the time of writing operation to the built-in TLB unit 80, the TLB parity generating & checking unit 83 generates a parity to be registered in the built-in TLB unit 80 in the same circuit as a check circuit.

When the address to be accessed is not registered in the built-in TLB unit 80, bus access is performed to the outside of the microprocessor 2. This bus access operation is same as the operation described with reference to FIG. 7 in the aforementioned operation of the cache memory.

Figure 8:
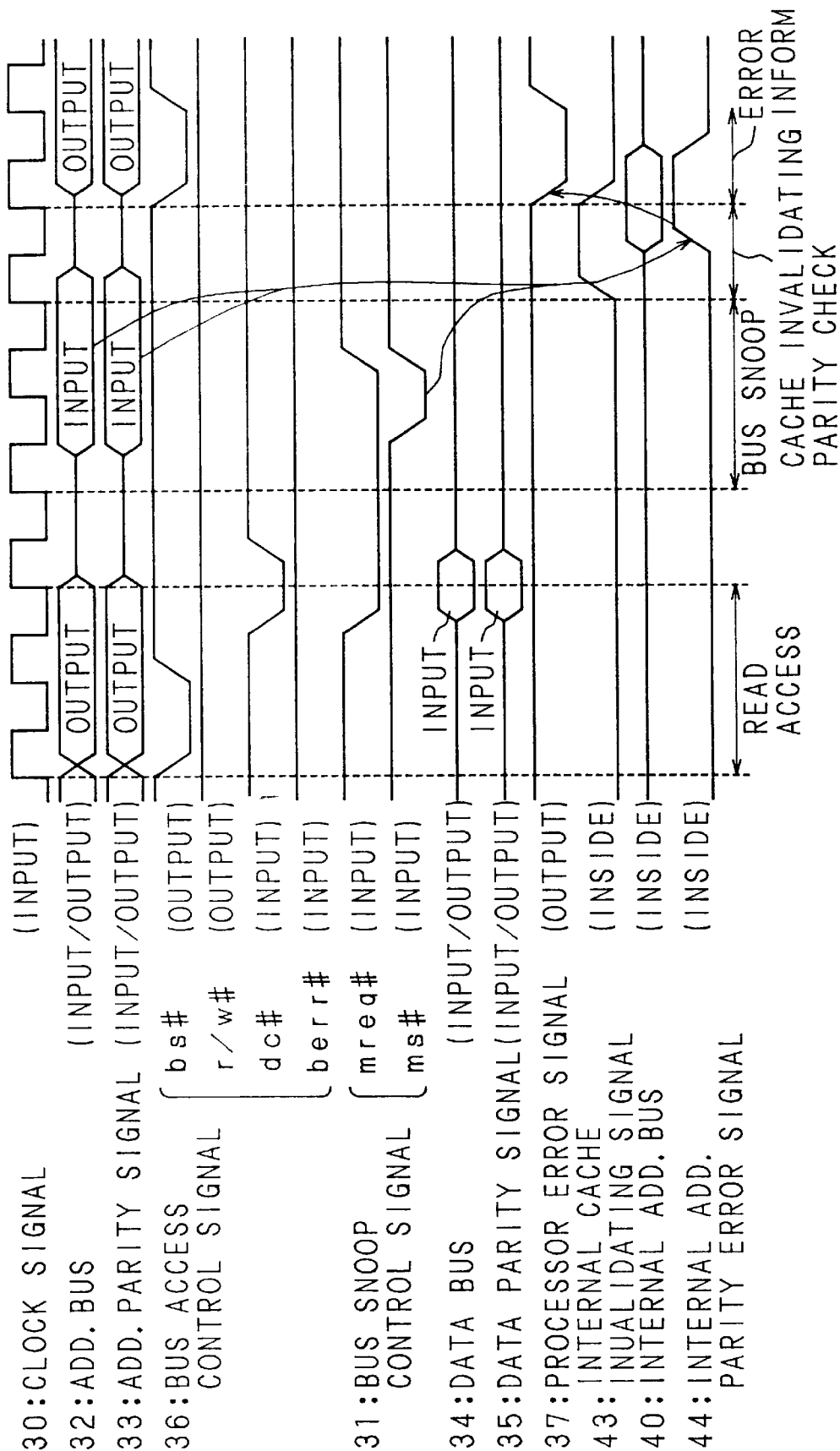
FIG. 8 is a timing chart showing states of respective signals at the time of bus snooping operation of a one-chip microprocessor of the present invention.

Next, the bus snooping operation is described with reference to a timing chart of FIG. 8 showing the states of respective signals at the time of bus snooping operation of the one-chip microprocessor 2 of the present invention.

Necessity of the bus snooping operation has been described in the description of the prior art.

The bus snoop control signal 31 and address to be invalidated are asserted to the microprocessor 2 from the external cache controller 4. When an mreq# signal which is one of the bus snoop control signal 31 is asserted, the address input-output/parity generating & checking unit 25 suspends to output the address bus 32 and the address parity signal 33.

Thereafter, to the address input-output/parity generating & checking unit 25, the address to be invalidated is inputted from the address bus 32, and the address parity signal 33 which is the address parity is inputted. When an ms# signal which is one of the bus snoop control signal 31 is inputted to the bus snoop control unit 24, the bus snoop control control unit 24 asserts the internal cache invalidating signal 43 to the cache access control unit 22.

At this time, the address input-output/parity generating & checking unit 25 outputs the address to be invalidated to the address bus 40 to generate the parity, and compares it with the address parity inputted simultaneously with the address for check. When receiving the internal cache invalidating signal 43, the cache access control unit 22 fetches the address to be invalidated from the internal address bus 40 and retrieves the built-in cache memory unit 20. When the address is registered in the built-in cache memory unit 20, the address is invalidated.

When the parity error is generated in the address bus 32 on the CPU board 1 by some fault, the parity generated in the address input-output/parity generating & checking unit 25 and the parity inputted from the outside do not coincide, and the parity error is detected. When the parity error is generated, the address input-output/parity generating & checking unit 25 asserts the internal address parity error signal 44 to the instruction execution unit 23.

When the internal address parity error signal 44 is asserted, the instruction execution unit 23 asserts the processor error signal 37.

Figure 9:
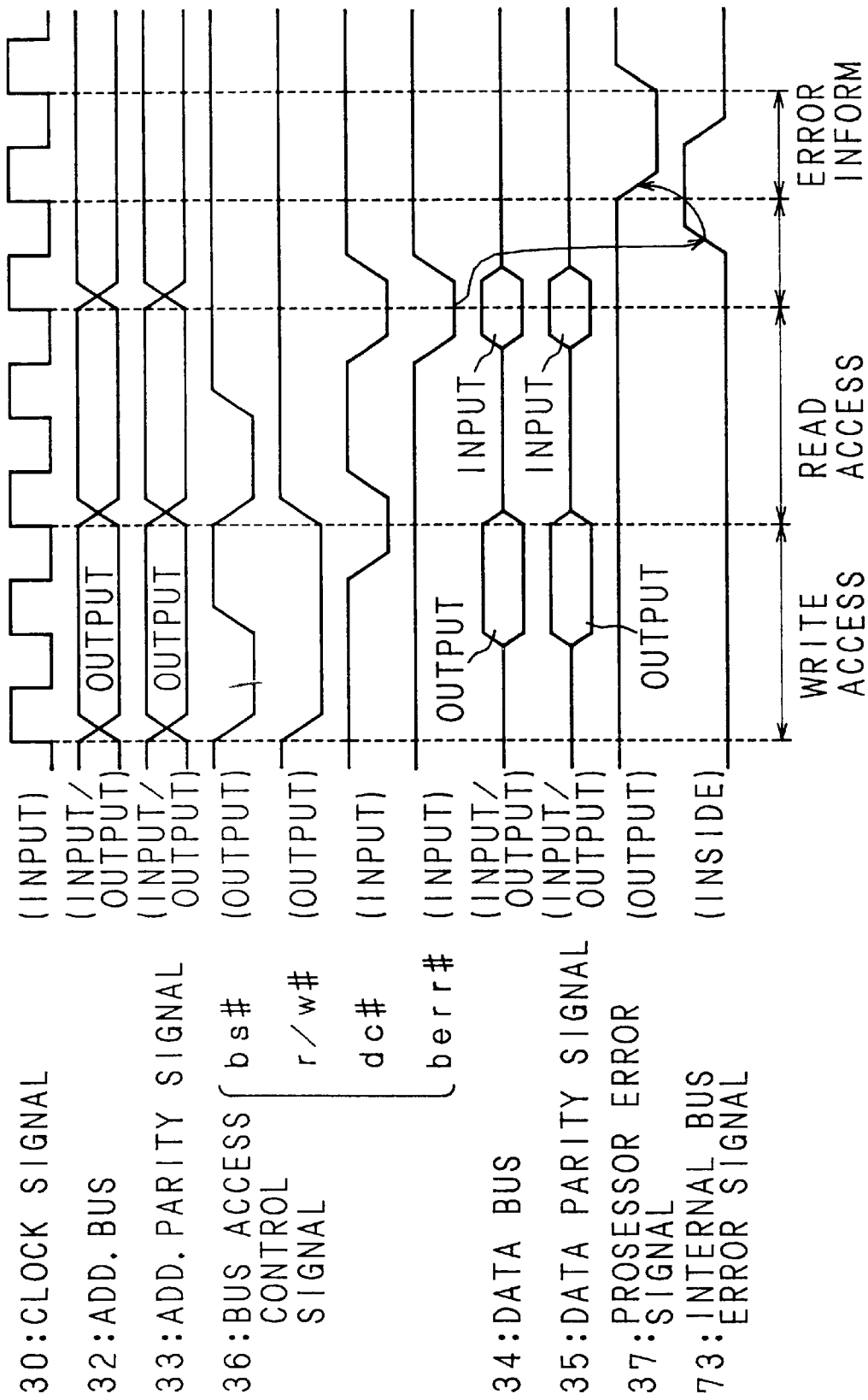
FIG. 9 is a timing chart showing states of respective signals at the time of operation, when a berr# signal is asserted together with a dc# signal which is one of the bus access control signals indicating the completion of access, at the time of reading data from the outside by a one-chip microprocessor of the present invention.

The operation of the microprocessor 2 of the present invention in case of asserting the dc# signal which is one of the bus access control signal 36 indicating the completion of access and the berr# signal, at the time of reading data from the outside of the microprocessor 2 by the one-chip microprocessor 2 of the present invention in the timing chart of FIG. 6, is described with reference to a timing chart of FIG. 9.

When the dc# signal which is one of the bus access control signal 36 indicating the completion of access and the berr# signal are asserted, the bus control unit 27 informs that the berr# signal has been asserted to the access request arbitration unit 59 of the instruction execution unit 23 by the internal bus access information signal 71. Then, the access request arbitration unit 59 asserts the internal bus error signal 73.

The operation in case of asserting the dc# signal which is one of the bus access control signal 36 indicating the completion of access and the berr# signal, at the time of writing data by the microprocessor 2 to the outside thereof, is also same.

The operation of the instruction execution unit 23 in case of asserting any of the internal cache parity error signal 50, internal address parity error signal 44, internal data parity error signal 42, internal bus error signal 73 and TLB parity error signal 75 is described.

When any of the internal cache parity error signal 50, internal data parity error signal 42, internal address parity error signal 44, internal bus error signal 73 and TLB parity error signal 75 is asserted, the instruction execution unit 23 shows a machine-check interrupt state which is the highest priority interrupt. In this case, the microprogram/microsequencer 54 starts the error processing immediately when the instruction is not being executed, and when the instruction being executed, starts the error processing after completing the instruction being executed. Simultaneously, the internal error signal 61 is outputted to the error signal output unit 53 to assert the processor error signal 37 to the outside of the microprocessor 2.

The error signal output unit 53 can also be constituted to assert the processor error signal 37 to the outside of the microprocessor 2, when any of the internal cache parity error signal 50, internal data parity error signal 42, internal address parity error signal 44, internal bus error signal 73 and TLB parity error signal 75 is asserted.

In the first internal register 68, responding to circumstances at the time of occurrence of error in the microprocessor 2, error information which is necessary and sufficient for analyzing the error is stored simultaneously with the occurrence of error. That is, by connecting the internal cache parity error signal 50, internal data parity error signal 42, internal address parity error signal 44, bus access state signal 72, internal bus error signal 73 and TLB parity error signal 75 to the first internal register 68, the kind of bus operations and errors are stored in the first internal register 68 as the error information.

For example, when the internal data parity error signal 42 is asserted when the bus access state signal 72 indicates that the kind of bus operation shows accessing of address translation table read for data read, error information of the data parity error of the address translation table read for data read is stored in the first internal register 68.

The status register 77 stores which bus access is performed at present, and the bus access state signal 72 is generated from the status register 77.

Since the microprogram/microsequencer 54 is not in the state to receive data from an upstream stage of a pipeline during the error processing, the instruction queue 60, instruction decoder 58 and address generating unit 55 in the upstream stage of the pipeline can not give the data to the next stage, thus execution of the instruction is practically suspended.

Since the instruction to be executed next is not given to the integer operation unit 56 and the floating-point operation unit 57 in a downstream stage of the pipeline than the microprogram/microsequencer 54 from the microprogram/microsequencer 54, the integer operation unit 56 and the floating-point operation unit 57 do not execute the instruction newly.

After the completion of error processing, the microprogram/microsequencer 54 clears the pipeline and built-in cache memory unit 20 in the instruction execution unit 23, and turns into a waiting state of an interrupt signal from the outside of the processor.

The interrupt controller 3 which detects the processor error signal 37 asserts the interrupt signal to the microprocessor 2. Responding to the interrupt, the microprocessor 2 executes the log-out operation for writing error information held by the first internal register 68 into the main memory 7 by the control of the microprogram/microsequencer 54. Thereafter, the microprocessor 2 reports the error to an operating system (OS) by the software interrupt, and a software interrupt handler of the OS analyzes the cause of error from the error information written in the main memory 7, and when possible, returns at a state just before the instruction where the error has occurred. When the error is fatal, the OS performs the system stop processing.

In a table of FIG. 10, the relationship between the kinds of bus operations and damages due to the occurrence of internal errors of the one-chip microprocessor 2 of the present invention is shown.

As the kinds of bus operations, there are an instruction read, an address translation table read for instruction read, a data read, an address translation table read for data read, a data write, an address translation table read for data write and a bus snoop. A symbol "o" in the figure indicates that it is possible to return from the instruction just before the occurrence of error, a symbol "x" indicates that it is not possible to return from the instruction just before the occurrence of error, and a symbol "-" indicates that there is no combination of the kind of access and the internal error.

In this way, in the microprocessor of the present invention, it is so constituted that parity errors of the cache, TLB, input data and input address can be detected internally to suspend execution of the instruction at an interval of the first instruction execution after the detection of error, and that the occurrence of error can be alerted to the outside of the processor. Thus, in the microprocessor of the present invention, instruction execution by using data including the parity error or data of the built-in cache memory which is not invalidated properly due to the parity error is prevented.

Since the address translation is not executed by the data including the parity error in the TLB, and the wrong instruction execution after the occurrence of error can be prevented, destruction of valuable data by the wrong instruction execution can be prevented in advance.

Also, by designating the kind of bus access at the time of occurrence of error as one of the error information, a possibility of restoration at a system level can be left.

As particularly described heretofore, according to the first invention of the one-chip microprocessor of the present invention, since parity bits are disposed in the built-in memory (cache memory, TLB) and the memory is provided with the parity check function, using of improper data due to memory faults of the software error and the like can be prevented.

According to the second invention, since a function for checking the address parity at the time of bus snooping operation is provided, the built-in cache is invalidated by using the improper address and using of the false data can be avoided.

All of there error detecting functions are integrated in the one-chip microprocessor or one LSI, thus error can be detected and reported rapidly. Thus, false instruction execution and destruction of data caused thereby can be prevented, and the malfunction of the microprocessor can be suppressed to the minimum.

Furthermore, in the third invention, by generating error information including the kinds of bus operations and errors at the time of occurrence of error, the error information can be analyzed to improve a possibility of restoration at the system level. Thus, reliability of the microprocessor can be enhanced.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A one-chip microprocessor, comprising:

instruction executing means for executing instructions;

storing means, accessible during instruction execution by said instruction execution means, for storing a plurality of data and parities correspondinq to respective data; and parity generating and checking means, which is connected to said storing means, for, when data is read from said storing means as part of instruction execution of said instruction executing means, comparing the stored parity of the data which has been read, with the parity of the data which has been read to generate a parity error signal when they do not agree;

wherein, when said parity generating and checking means generates said parity error signal, said instruction. executing means suspends the instruction execution and outputs a signal to outside the chip to inform of an occurrence of error.

2. A one-chip microprocessor as set forth in claim 1, wherein said storing means is a cache memory.

3. A one-chip microprocessor as set forth in claim 1, wherein said storing means is a TLB (Translation Lookaside information showing whether the bus access is a read access or a write access, information showing whether an object to be accessed is an instruction or data, information showing whether said memory management unit accesses said address translation table or not for translating the read access address, and information showing whether said memory management unit accesses the address translation table or not for translating the write access address, in said status register, and said error register holds said error signal and information held in said status register, when said error detecting means detects the error.

4. A one-chip microprocessor, comprising:

an instruction execution unit executing instructions;

a cache memory which is accessible during instruction execution by said instruction execution unit;

an internal address bus;

address inputting means for inputting addresses from outside the chip and outputting them to said internal address bus;

address parity inputting means for inputting address parities from outside the chip;

bus snooping means, to which an invalidating request signal of said cache memory is inputted from outside the chip, for snooping said internal address bus and outputting a predetermined signal when an address outputted to said internal address bus is an address to be invalidated; and parity checking means, which is connected to said internal address bus and said address parity input means, for, when a predetermined signal is outputted from said bus snooping means, checking the address parity outputted to said internal address bus, and generating a parity error signal when detecting a parity error;

wherein, when said parity checking means generates said parity error signal, said instruction execution unit suspends instruction execution and outputs a signal to outside the chip to inform of an occurrence of error.

5. A one-chip microprocessor, comprising:

an instruction execution unit executing instructions;

a memory which is accessible during instruction execution by said instruction execution unit;

a memory management unit performing address translation by referring to an address translation table of an instruction from said instruction execution unit;

a bus access control unit performing external bus access by request from said instruction execution unit or said memory management unit;

error detecting means for detecting an abnormal bus access generated as a result of bus access by said bus access control unit, and generating different error signals corresponding to kinds of resulting abnormal bus access;

a status register which is connected to said bus access control unit, storing a kind of bus access being executed; and an error register, which is connected to said error detecting means and said status register, holding error information;

wherein said bus access control unit, when starting the bus access, holds
information indicating whether the bus access is a read access or a write access,
information indicating whether an object to be accessed is an instruction or data,
information indicating whether said memory management unit accesses said address translation table or not for translating a read access address, and information indicating whether said memory management unit accesses an address translation table or not for translating a write access address, in said status register, and said register holds said error signal and information held in said status register, when said error detecting means detects an error.

6. A one-chip microprocessor as set forth in claim 5, further comprising:

a terminal receiving, from the outside, a bus error signal showing that the bus access is not completed normally;

wherein said error detecting means inputs said bus error signal from said terminal and sends it to said error register.

7. A one-chip microprocessor as set forth in claim 5, further comprising:

data inputting means, and data parity signal inputting means responding to said data input means, wherein said error detecting means inputs data and a data parity from said data inputting means and said data parity signal inputting means for parity check and sends an error signal to said error register when detecting the parity error.

8. A one-chip microprocessor as set force in claim 5, further comprising:

a cache memory which is accessible by instruction execution of said instruction execution unit, and stores a plurality of data and parities responding to the respective data;

wherein said error detecting means is connected to said cache memory, and when data is read from said cache memory by the instruction execution of said instruction execution unit, generates the parity of the data which has been read, checks the parity read from said cache memory responding to the data which has been read, and generates a parity error signal and sends it to said error register when detecting a parity error.

9. A one-chip microprocessor as set forth in claim 5, further comprising:

a TLB (Translation Lookaside Buffer) which is accessible by the request of said instruction execution unit, and stores a plurality of data and parities responding to the respective data;

wherein said error detecting means is connected to said TLB, and when data is read from said TLB by instruction execution of said instruction execution unit, generates the parity of the data which has been read, checks the parity read from said TLB responding to the data which has been read, and generates a parity error signal and sends it to said error register when detecting a parity error.

10. A one-chip microprocessor as set forth in claim 5, further comprising:

a cache memory accessible by the request of said instruction execution unit;

an internal address bus;

address inputting means for inputting addresses from the outside and outputting them to said internal address bus;

address parity input means for inputting address parities from the outside; and bus snooping means, to which an invalidating request signal of said cache memory is inputted from the outside, for snooping said internal address bus and outputting a predetermined signal when the address outputted to said internal address bus is the address to be invalidated; and wherein said error detecting means is connected to said internal address bus and said address parity inputting means, and when said predetermined signal is outputted from said bus snooping means, checks the address parity outputted to said internal address bus, and generates a parity error signal and sends it to said error register when detecting a parity error.

* * * * *